235-382 SR
1/13/87 XR 4,636,622

United States Patent [19]

Clark

[11] Patent Number: 4,636,622

[45] Date of Patent: Jan. 13, 1987

[54] CARD USER IDENTIFICATION SYSTEM

[76] Inventor: Clement P. Clark, 70 Paugus Rd., Holden, Mass. 01520

[21] Appl. No.: 730,944

[22] Filed: May 6, 1985

[51] Int. Cl.[4] .................. G06K 5/00
[52] U.S. Cl. .................. 235/380; 235/382
[58] Field of Search .................. 235/380, 382; 382/4

[56] References Cited

U.S. PATENT DOCUMENTS 4,144,684 11/1983 Blonder .................. 382/4

*Primary Examiner*—Harold I. Pitts

[57] ABSTRACT

A computerized fingerprint matching system is shown for rapidly identifying a person presenting a previously issued identity card to complete a transaction. The user of a credit card, for example, can prove his right to have it in his possession for use in completing a financial transaction and upon proof of his fingerprint identity the system simultaneously makes a record of the transaction. Means are shown to indicate a disapproval of a particular transaction if the account for that card is overdrawn and other means are shown for recording a photograph and a fingerprint of any person in possession of the card when an unauthorized holder of a card presents the card at a card reader station.

6 Claims, 1 Drawing Figure

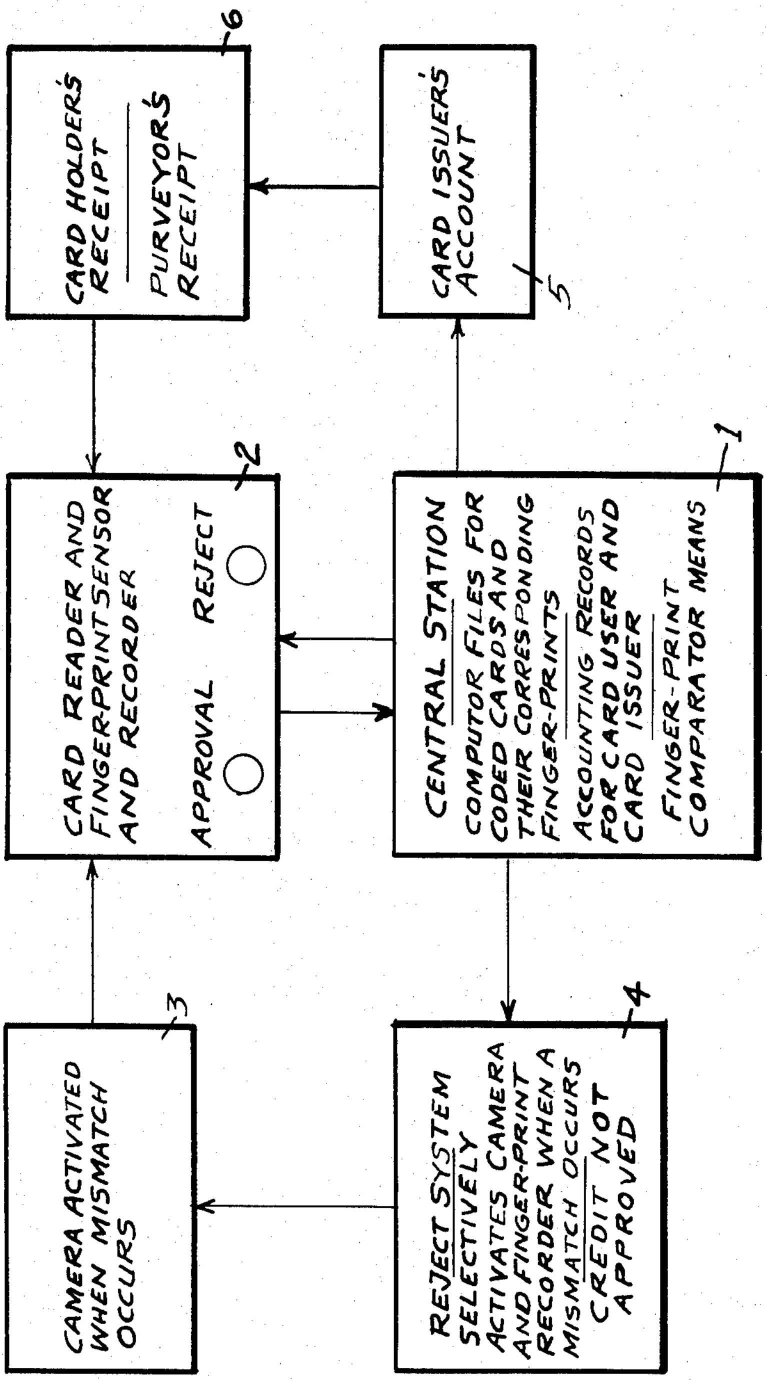
CARD HOLDER'S RECEIPT
PURVEYOR'S RECEIPT
6
CARD ISSUERS' ACCOUNT
5
CARD READER AND FINGER-PRINT SENSOR AND RECORDER
APPROVAL
REJECT
2
CENTRAL STATION
COMPUTOR FILES FOR CODED CARDS AND THEIR CORRESPONDING FINGER-PRINTS
ACCOUNTING RECORDS FOR CARD USER AND CARD ISSUER
FINGER-PRINT COMPARATOR MEANS
1
CAMERA ACTIVATED WHEN MISMATCH OCCURS
3
REJECT SYSTEM SELECTIVELY ACTIVATES CAMERA AND FINGER-PRINT RECORDER WHEN A MISMATCH OCCURS
CREDIT NOT APPROVED
4

CARD USER IDENTIFICATION SYSTEM

FIELD OF THE INVENTION

This invention relates to a system for handling identifying cards including equipment for verifying the identity of the user of and for approving a credit rating when such card is a credit card.

BACKGROUND OF THE INVENTON

The use of identity cards is widespread in completing credit transactions, for use in instant money banking, security entrance controls, etc. Such cards are issued to authorized persons and it is desirable to provide means at the point of use of the card to check on the identity of the individual presenting the card, for example for payment of a bill, before completing such transaction.

To date the most effective way known to insure the identity of an individual is to record a fingerprint or, preferably the prints of several of that person's fingers for comparison with the supposedly corresponding prints of the fingers of the person using the card that are scanned at a later date. When the two sets of prints match, a proper identification is made of the person whose prints are being scanned.

Various systems for identifying the user of a card have been proposed for use for example with credit cards etc, the following being the best examples of such art known to the inventor at the time of the filing of this application.

| U.S. Pat. Nos. | |
|---|---|
| 3,383,657 to Claasen et al | March 14, 1968 |
| 3,532,426 to Lemmond | October 6, 1970 |
| 3,584,958 to Miller | June 15, 1971 |
| 3,781,113 to Thomas | December 25, 1973 |
| 4,048,618 to Hendry | September 13, 1977 |
| 4,202,120 to Engle | May 13, 1980 |
| 4,253,086 to Szwarcbier | February 24, 1981 |
| 4,414,684 to Blonder | November 8, 1983 |

BRIEF DESCRIPTION OF THE INVENTION

The present disclosure provides an improvement on the systems shown above in providing a card system making use of a centrally recorded fingerprint to confirm the identity of a person presenting the card for approval. The card may be an entry identifying card for controlling admissions into secure regions, a credit card, an instant money banking card, or a card for any such similar system. Usually the card has a code number, or other identifying indicia such as a magnetic imprint or the like, that is recorded in a filing system that may be maintained at a central station after the card has been issued to an authorized user. Simultaneously with the issuance of the card, the user's fingerprint or several of his or her prints are recorded together with the coded indicia at the central operating office and file bank used for servicing that card system.

When the card is used for a commercial or other transaction it is thereafter presented at a separate card reader station having a fingerprint reader associated therewith. The card code is then operative through a computer means to call up a copy of the fingerprint or prints of the person who is authorized to use that card which is exposed at the reader and a separate computer operated means compare the print transmitted to the central operating station with the print on record for the authorized user. If there is a match between the recorded print and the print transmitted from the reader station to the central file, a signal of approval shows at the card reader station. In this event the transaction is allowed to proceed. If a fingerprint mismatch shows up, however, a rejection signal is transmited to the card reader station and a permanent record is made of the fresh fingerprint that is or prints that are exposed at that station and preferably a photograph of the person presenting the card, who is standing at the card reader station, is made.

If the card is a credit card or instant money card, upon a proper match of the print or prints being found with the fingerprint record at the central file for that coded card, the money transaction proceeds and the system includes computer means to test the credit available to that card for approval and if the amount of the transaction can be authorized for that card's account, means are provided to enter the value of the transaction in the account at the central operating office and at the card reader station, where a permanent record is also made and a receipt is issued at the card reader station for the approved card user's records.

IN THE DRAWINGS

A schematic layout of the system of this invention is shown.

DETAILED DESCRIPTION OF THE INVENTION

This invention makes use of a central file station 1 having computer operated equipment for recording the indicia or other coded index devices used on each of the individual cards issued to approved users of the cards in the system. When a card is handed to a person authorized to use that particular card, that person's thumb print or if desired, additional fingerprints are simultaneously recorded in the central file under that card's coded index record. The computer means at the central file, in addition, if the card is a credit card or bank card or the like, is also adapted to maintain a running account record of the financial transactions entered into by the authorized user of a given coded card and all such transactions are entered therein whenever the card is presented for payment of bills, etc.

The central file is equipped with well known computer equipment having a memory bank sufficiently large and capable of substantially instantaneously calling up data filed under the coded card indicia including the recorded fingerprint or prints of the authorized holder of the card as well as a statement of the current status of the financial account credited to that card for reference when a financial transaction is involved. These fingerprint data when retrieved from the memory bank are fed to a known computer fingerprint comparator means at the central file station so that a substantially instantaneous comparison between the print exposed at a card reader station and the fingerprint associated with that coded card can be made as will be explained more fully below.

A card reading station 2 that is located at a remote position with respect to the central file, cooperates with the central file through suitable electronic connections such as telephone communication lines and the card reader station is equipped with well known transmitter means for sending the encoded card indicia to the central file. Such a transmitter may take the form of a punch card reader, typewriter to transmit a numerical code, a magnetic code reader, or the like. The card reader station is also equipped with well known means upon which the card user places the finger or fingers of his hand for the instantaneous scanning of his fingerprints. There are additional means available at the card reader station to transmit pictures of such prints exposed on the scanner to the central file and to make a permanent record thereof if desired. When the card's encoded indicia and the fingerprint or prints are transmitted from the card reader station to the central station the computer means presents the scanned fingerprint to a known computerized comparator means where an almost instantaneous fingerprint comparison can be made to show that the user presenting the card for approval does have or does not have a print or prints identical to the record at the central file.

The card reader station 2 also has a camera 3 pointed at the fingerprint scanning means to take a photograph of the person standing at the fingerprint scanner when the camera is activated. The fingerprint scanner means is also equipped with known means to produce a permanent record of the fingerprint or prints of the fingers exposed on the scanner when the camera is activated. These recorded prints may be stored at any convenient file center and together with the photograph will provide positive identification of an unauthorized user of the card which process of identifying users will certainly discourage theft of such cards and their unauthorized use.

The card reader station 2 also has signal means associated therewith to indicate when the card submitted by a user has been fully checked at the central file. These signal means are activated to provide a signal showing an approval or rejection message as soon as the fingerprint comparison and if necessary credit check of the user's account has been completed at the central file.

At the central file station, the computer means includes automatically activated triggering device 4 to operate the camera and fingerprint recording means when the fingerprint or fingerprints of any particular card user does not or do not match the print or prints recorded for that particular encoded card then exposed at the card reader station 2. In this instance a permanent identity record is made both photographically and by recording the fingerprint of the unauthorized user of that particular card. On the other hand, if the fingerprint data transmitted to the central station 1 matches the print data recorded for the respective card presented by that user, the approval signal is operated. But if a transaction involving money is concerned the accounting record must be accessed and the amount of the purchase or withdrawal approved before the transaction associated with the card's use can proceed.

As above indicated, suitable accounting files are maintained at the central file in which there are running financial accounts covering the transactions entered into by each of the parties authorized to use the respective cards. In the case of a credit card, for example, the card user's account is credited and debited at the central file when payments and charges are made thus, the financial account of the issuer of the card pertaining to the authorized user's activities are maintained at 5 at the central file and the purveyor's corresponding accounting records 6 are maintained as well. Computer equipment for making such records and maintaining them on a current basis are well known in the art and suitable connections are made between the card reader station and the computer mechanisms at the central file to instantaneously enter the data whereby to update all of those accounts when an acceptable fingerprint match and credit approval signal is sent to the card reader station.

The central file computer is also operative to produce a record at the card reader station in a form to supply a receipt and statement of the current status of his account to the authorized card user whose transaction has just been scrutinized and then approved at the central file.

On the other hand, if the authorized card user whose fingerprint matches the record at the central file, has requested authorization to spend or have cash issued to him in an amount in excess of that which his account indicates is available to him, the central file computer activates the reject signal at the card reader station, but does not initiate the camera and fingerprint recording means. The system may also be programed to indicate the amount of the requested over draft so that the card user and the purveyor may then take such other action as may be deemed appropriate to satisfy the situation and retain the good will of the user of the card standing at the card reader station.

Computer equipment capable of activating the appropriate signals, maintaining the accounting, records, filing data in memory banks and for performing all of the functions described above, are all well known.

Very recently suitable fingerprint comparator means has become available that can produce a permanent fingerprint record and also indicate a match or mismatch of two sets of prints. Such a machine is produced by NEC Information Systems, Inc. and is currently in use in California law enforcement activities. Since the print or prints associated with the card bearing a particular coded indicia is or are stored in the central computer, they can be easily recalled to be compared with the print or prints exposed to the scanner at the card reader station, so that the prints to be inspected can be almost instantaneously compared for possible matching or mismatches. The operations of print comparison of the authorized user's prints with the prints of the person at the card reader station scanner is thus performed substantially instantaneously. Therefore, the required user approval or rejection operation and, if also necessary, account approval manipulations, can be completed about as quickly as an electrical communication can be completed between the card reader station, the central file, and back to the card reader station.

The card reader equipment likewise can be constructed of known devices for either reading a magnetic or other code printed on the card or for scanning any other type of identifying indicia impressed on the face of the card or the like. Any suitable means 3 may be provided that is responsive to the rejection signal when there is a mismatch of the prints to set the fingerprint scanner recorder in operation as well as operate the camera. As also indicated above the systems can be programed to update and otherwise maintain running accounting records of financial transactions for and also provide suitable receipts for the card user, the respective purveyor of goods and services and the credit card issuer.

It is apparent from the above, how the system here described is operative. Many modifications thereof may occur to those skilled in the art that will fall within the scope of the following claims.

What is claimed is:

1. A means for reading coded indicia on a card and for scanning a card user's fingerprint for a comparison with the file record of the authorized card holder's fingerprint comprising a card reader means in combination with a fingerprint exposure device that includes an instantaneous fingerprint scanner, remotely disposed comparator means for comparing the scanned fingerprint with said file record fingerprint of the authorized card holder, means for transmitting signals between said reading and scanning means and said comparator means, means activated by the fingerprint comparator to indicate at the card reader means when a proper fingerprint match occurs, and other means activated by the fingerprint comparator to otherwise indicate that an unauthorized user is standing at the card reader means, which other means is also operative to activate means adapted to make a permanent record of the fingerprint that is exposed to the scanner when the comparator indicates a mismatch of the scanned fingerprint with the recorded fingerprint occurs.

2. A means for reading and scanning as in claim 1 wherein the card is a credit card and the card reading means is located at a cashier's station and said fingerprint comparator also activates means to read the amount of credit to be added to or charged against the running account maintained for the card in the reader, during a particular transaction and including means to temporarily post the amount to be credited against the card account maintained at the remotely disposed means, means at said remotely disposed means to compare the temporary posting with the current account of credit available to the card being scanned, means operated by said last named means to add that amount to the file record when the amount to be credited against the account is approved and subtracting that amount from the account at the remotely disposed means showing the current credit that will be available to the card positioned in the reader after that transaction is completed, including means to produce a record of that particular transaction at the cashier's station for use by the cashier and the card holder, and other means at said remotely disposed means to otherwise indicate at the cashier's station when the temporarily posted amount is more than the current amount of the credit available to the user as determined by the comparison of said temporary posting with said current account of the credit card holder.

3. A means for reading and scanning as in claim 1 wherein a camera and activating means therefor are positioned adjacent the card reader means, and said other means activated by said fingerprint comparator is also operative to operate said camera activating means to simultaneously snap a photograph of the person at the fingerprint scanner when a mismatch occurs whereby a picture of the person is made and his fingerprint is recorded.

4. A means for reading and scanning as in claim 1 wherein a multiplicity of said card reader and associated fingerprint exposure means are disposed at separate work stations, and each of said respective card readers and fingerprint exposure means is electronically connected to said remotely disposed means.

5. A means for reading and scanning as in claim 2 wherein a multiplicity of said card reader and associated fingerprint exposure means are disposed at separate work stations and each of said respective card readers and fingerprint exposure means is electronically connected to said remotely disposed means.

6. A means for reading and scanning as in claim 3 wherein a multiplicity of said card reader and associated fingerprint exposure means are disposed at separate work stations and each of said respective card readers and fingerprint exposure means is electronically connected to said remotely disposed means.

* * * * *